United States Patent
Lee

(10) Patent No.: US 8,867,900 B2
(45) Date of Patent: Oct. 21, 2014

(54) EMULATION PREVENTION BYTE REMOVERS FOR VIDEO DECODER

(75) Inventor: Kyung-Koo Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1874 days.

(21) Appl. No.: 12/071,831

(22) Filed: Feb. 27, 2008

(65) Prior Publication Data

US 2008/0209180 A1 Aug. 28, 2008

(30) Foreign Application Priority Data

Feb. 27, 2007 (KR) ........................ 10-2007-0019787

(51) Int. Cl.
| H04N 5/76 | (2006.01) |
| H04N 5/93 | (2006.01) |
| H04N 19/593 | (2014.01) |
| H04N 19/44 | (2014.01) |
| H04N 19/132 | (2014.01) |
| H04N 19/42 | (2014.01) |
| H04N 19/169 | (2014.01) |

(52) U.S. Cl.
CPC ... *H04N 19/00127* (2013.01); *H04N 19/00763* (2013.01); *H04N 19/00533* (2013.01); *H04N 19/00478* (2013.01); *H04N 19/00254* (2013.01)
USPC .......................................... 386/278; 386/353

(58) Field of Classification Search
USPC .......................................... 386/278, 353, 356
See application file for complete search history.

(56) References Cited

U.S. PATENT DOCUMENTS

| 2004/0030665 A1* | 2/2004 | Sullivan ........................ 706/48 |
| 2005/0007263 A1 | 1/2005 | Zhou |
| 2005/0265449 A1 | 12/2005 | Yoon |
| 2006/0013318 A1* | 1/2006 | Webb et al. .............. 375/240.25 |
| 2008/0130735 A1* | 6/2008 | Meric ........................... 375/240 |

FOREIGN PATENT DOCUMENTS

| JP | 2003-080788 A | 3/2003 |
| KR | 10-2004-0075956 | 8/2004 |
| KR | 10-2004-0075956 A | 8/2004 |
| KR | 10-2005-0113501 A | 12/2005 |
| WO | WO 03/090470 | 10/2003 |

OTHER PUBLICATIONS

Bin Sheng, Wen Gao, Don Xie, et al., "An efficient VLSI architecture of VLD for AVS HDTV decoder", IEEE Trans. on Consumer Electronics, vol. 52, No. 2, pp. 696-701, May 2006.*

M. Alle , J. Biswas and S. K. Nandy "High performance VLSI architecture design for H.264 CAVLC decoder", Proc. IEEE 17th Int. Conf. Application-Specific Systems, Architectures Processors, pp. 317-322, 2006.*

* cited by examiner

*Primary Examiner* — Robert Chevalier
(74) *Attorney, Agent, or Firm* — Harness, Dickey & Pierce, PLC

(57) ABSTRACT

An emulation prevention byte remover may include one or more of a first buffer, a second buffer, a checker, and a shifter. The first buffer may store first stream data. The second buffer may store second stream data. The checker may determine whether one or more emulation prevention bytes are included in the first, second, or first and second stream data. If the checker determines that the one or more emulation prevention bytes are included in the first, second, or first and second stream data, the checker may output a check signal. In response to the check signal, the shifter may remove at least one of the one or more emulation prevention bytes from the first, second, or first and second stream data. The shifter may generate output stream data based on the first, second, or first and second stream data.

18 Claims, 4 Drawing Sheets

Fig. 3

| | $A_{k-2}[15:0]$ | | $A_{k-1}[31:0]$ | | | | $A_k[31:0]$ | | | |
|---|---|---|---|---|---|---|---|---|---|---|
| | P1 | P0 | A7 | A6 | A5 | A4 | A3 | A2 | A1 | A0 |
| Case 0 | 00 | 00 | 03 | 01 | 04 | 05 | 06 | 07 | 08 | 09 |
| Case 1 | | 00 | 00 | 03 | 01 | 04 | 05 | 06 | 07 | 08 |
| Case 2 | | | 00 | 00 | 03 | 01 | 04 | 05 | 06 | 07 |
| Case 3 | | | | 00 | 00 | 03 | 01 | 04 | 05 | 06 |
| Case 4 | 00 | 00 | 03 | 01 | 00 | 00 | 03 | 01 | 04 | 05 |

Fig. 4

| | | $A_{k-2}[15:0]$ | | $A_{k-1}[31:0]$ | | | | $A_k[31:0]$ | | | |
|---|---|---|---|---|---|---|---|---|---|---|---|
| | P1 | P0 | A7 | A6 | A5 | A4 | A3 | A2 | A1 | A0 | |
| T11 | 00 | 00 | 03 | 01 | 04 | 05 | 06 | 07 | 08 | 09 | P=0 |
| T12 | 05 | 06 | 06 | 07 | 08 | 09 | 04 | 05 | 06 | 07 | P=1 |

Fig. 5

| | | $A_{k-2}[15:0]$ | | $A_{k-1}[31:0]$ | | | | $A_k[31:0]$ | | | |
|---|---|---|---|---|---|---|---|---|---|---|---|
| | P1 | P0 | A7 | A6 | A5 | A4 | A3 | A2 | A1 | A0 | |
| T21 | 00 | 00 | 00 | 03 | 01 | 04 | 05 | 06 | 07 | 08 | P=0 |
| T22 | 04 | 05 | 05 | 06 | 07 | 08 | 09 | 04 | 05 | 06 | P=1 |

Fig. 6

| | | $A_{k-2}[15:0]$ | | $A_{k-1}[31:0]$ | | | | $A_k[31:0]$ | | | |
|---|---|---|---|---|---|---|---|---|---|---|---|
| | P1 | P0 | A7 | A6 | A5 | A4 | A3 | A2 | A1 | A0 | |
| T31 | 00 | 00 | 00 | 00 | 03 | 01 | 04 | 05 | 06 | 07 | P=1 |
| T32 | 04 | 05 | 04 | 05 | 06 | 07 | 08 | 09 | 04 | 05 | P=2 |

EMULATION PREVENTION BYTE REMOVERS FOR VIDEO DECODER

PRIORITY STATEMENT

This application claims priority from Korean Patent Application No. 10-2007-0019787, filed on Feb. 27, 2007, in the Korean Intellectual Property Office (KIPO), the entire contents of which are incorporated herein by reference.

BACKGROUND

1. Field

Example embodiments relate to image processing systems. Also, example embodiments relate to image processing systems including video decoders. Additionally, example embodiments relate to emulation prevention byte removers for the video decoders.

2. Description of Related Art

H.264 is the standard of digital video codec proposed by International Telecommunication Union-Telecommunication Standardization Sector (ITU-T), regarded as one of packet-based, motion-picture compression technologies applicable to video conferences, broadcastings, and streaming services. H.264 is more efficient than either MPEG-2 (based on H.262) or MPEG-4 (based on H.263) in data compression rate.

According to the H.264 compression mode, stream data may be accompanied by emulation bytes such as 0x000001, 0x000002, 0x000003, and so forth. An H.264 system usually incorporates an emulation prevention byte '0x03' into stream data of an emulation-byte type so as to differentiate emulation bytes from normal stream data. In practice, normal stream data, such as 0x000001, 0x000002, and 0x000003, are modified to 0x00000301, 0x00000302, and 0x00000303, respectively.

For decoding stream data with a decoder, the emulation prevention bytes must be eliminated from the stream data. However, there is a limit to eliminating the emulation prevention bytes using software in processing stream data with high image resolution and high frequency.

SUMMARY

Example embodiments are directed to emulation prevention byte removers for efficiently eliminating emulation prevention bytes from stream data.

According to example embodiments, an emulation prevention byte remover may include: a first buffer; a second buffer; a checker; and/or a shifter. The first buffer may store first stream data and/or the second buffer may store second stream data. The checker may determine whether one or more emulation prevention bytes are included in the first stream data, the second stream data, or the first and second stream data. If the checker determines that the one or more emulation prevention bytes are included in the first stream data, the second stream data, or the first and second stream data, the checker may output a check signal. In response to the check signal, the shifter may remove at least one of the one or more emulation prevention bytes from the first stream data, the second stream data, or the first and second stream data. The shifter may generate output stream data based on the first stream data, the second stream data, or the first and second stream data.

According to example embodiments, an emulation prevention byte remover may include: a first buffer; a second buffer; a third buffer; a checker; a shifter; and/or a pointer. The first buffer may store first stream data, the second buffer may store second stream data, and/or the third buffer may store third stream data. The checker may determine whether one or more emulation prevention bytes are included in one or more of the first, second, and third stream data. If the checker determines that the one or more emulation prevention bytes are included in the first stream data, the second stream data, or the first and second stream data, the checker may output a check signal. In response to the check signal, the shifter may remove at least one of the one or more emulation prevention bytes from the first stream data, the second stream data, or the first and second stream data. The pointer may output a pointer value. The shifter may generate output stream data from a position designated by the pointer value. At least part of the output stream data may be stored in the third buffer as the third stream data.

BRIEF DESCRIPTION OF THE DRAWINGS

The above and/or other aspects and advantages will become more apparent and more readily appreciated from the following detailed description of example embodiments taken in conjunction with the accompanying drawings, in which:

FIG. 3 is an exemplary diagram of various cases in which one or more emulation prevention bytes are included in stream data; and FIGS. 4 through 6 are exemplary diagrams showing various patterns of stream data in order to explain operation of the emulation prevention byte remover of FIG. 2.

DETAILED DESCRIPTION OF EXAMPLE EMBODIMENTS

Figure 1:
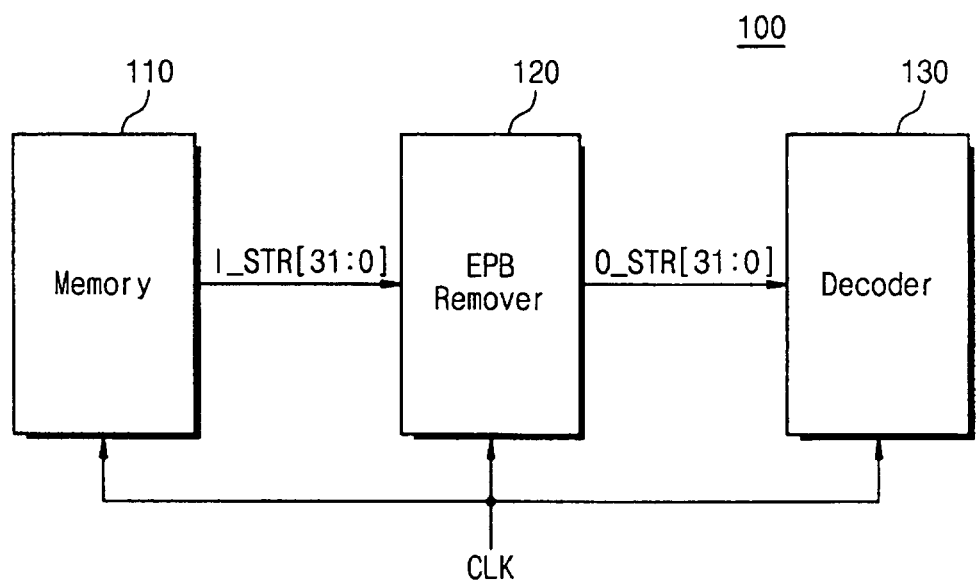
FIG. 1 is a block diagram of an image processing system according to example embodiments.

Example embodiments will now be described more fully with reference to the accompanying drawings. Embodiments, however, may be embodied in different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when an element is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram of an image processing system according to example embodiments.

Referring to FIG. 1, the image processing system 100 may comprise a memory 110, an emulation prevention byte (EPB) remover 120, and/or a decoder 130. In practice, the image processing system 100 (such an H.264 system) may include more components in addition to the function blocks shown in FIG. 1, but herein are exemplarily illustrated the functional blocks necessary for eliminating emulation prevention bytes.

The EPB remover 120 may receive input stream data I_STR[31:0] from the memory 110 in sync with a clock signal CLK. The memory 110 may be connected with the EPB remover 120, for example, by way of a direct memory access (DMA) block. In example embodiments, the memory 110 may comprise a first-in, first-out (FIFO) memory.

The EPB remover 120 may determine whether one or more EPBs are included in the input stream data I_STR[31:0]. If there are one or more EPBs in the input stream data I_STR [31:0], the EPB remover 120 may eliminate at least one of the one or more EPBs from the input stream data I_STR[31:0] and may output stream data O_STR[31:0] in, for example, the unit of a word. The unit word may comprise, for example, four bytes. The decoder 130 may operate to decode the output stream data O_STR[31:0], without the at least one of the one or more EPBs.

The EPB remover 120 may not be able to generate the output stream data O_STR[31:0] from a single one of the input stream data I_STR[31:0] if there are one or more EPBs in the input stream data I_STR[31:0]. Therefore, the EPB remover 120 may be configured in a structure capable of receiving at least two sequential sets of the input stream data I_STR[31:0] and then may generate the output stream data O_STR[31:0].

Figure 2:
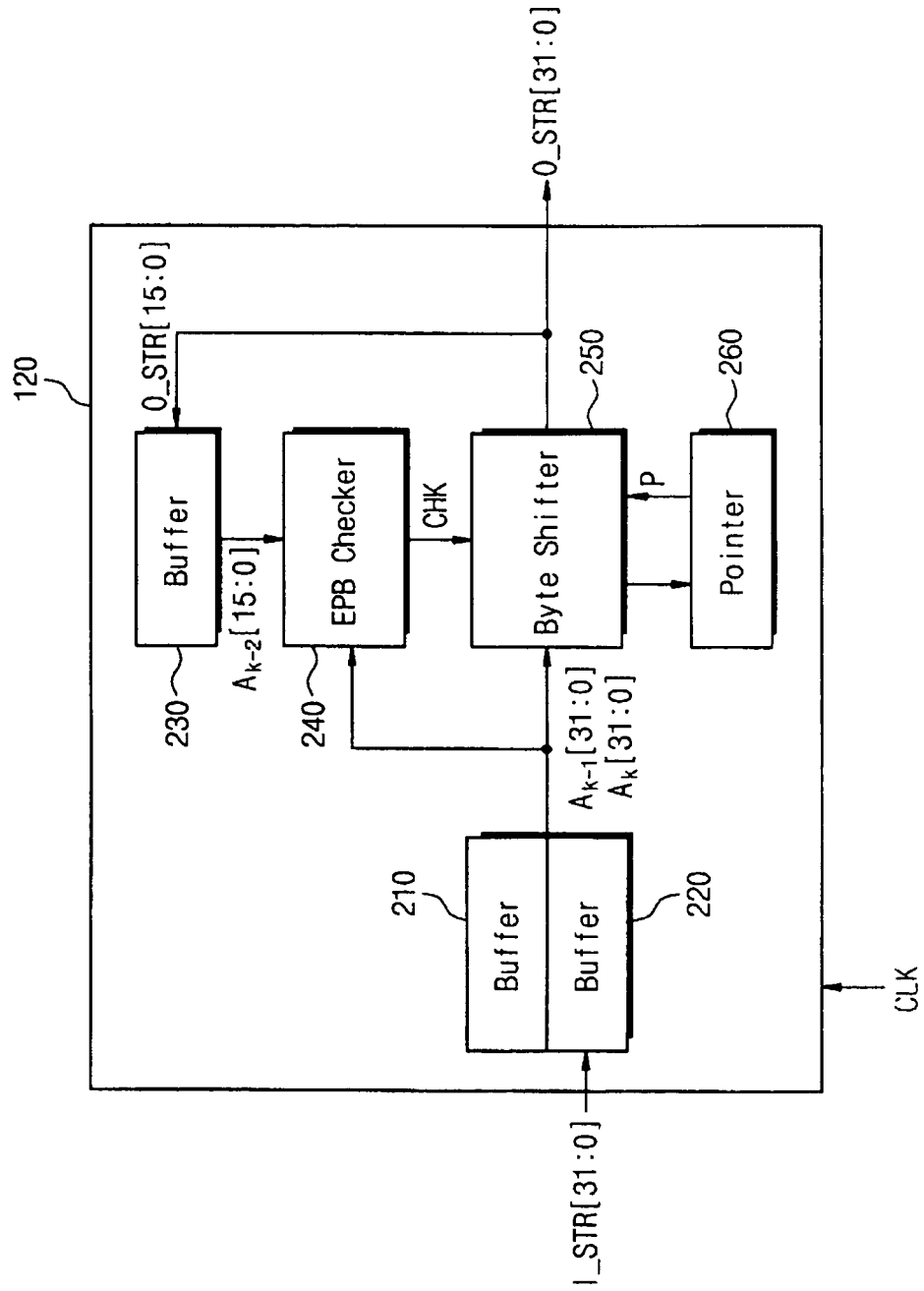
FIG. 2 is a block diagram showing a detailed structure of an emulation prevention byte remover according to example embodiments.

FIG. 2 is a block diagram showing a detailed structure of the EPB remover 120 according to example embodiments.

Referring to FIG. 2, the EPB remover 120 may comprise buffer 210, buffer 220, buffer 230, EPB checker 240, byte shifter 250, and/or pointer 260.

The input stream data I_STR[31:0] from the memory 110 shown in FIG. 1 may be stored in the buffer 220, for example, in sync with the clock signal CLK. In the next clock cycle, the k'th stream data $A_k[31:0]$ stored in the buffer 220 may be transferred to the buffer 210 as the (k−1)'th stream data $A_{k-1}[31:0]$. The input stream data I_STR[31:0] newly input from the memory 110 may be stored in the buffer 220 as the k'th stream data $A_k[31:0]$.

The byte shifter 250 may receive the k'th stream data $A_k[31:0]$ from the buffer 220 and the (k−1)'th stream data $A_{k-1}[31:0]$ from the buffer 210, and may generate the output stream data O_STR[31:0], for example, by shifting the k'th stream data $A_k[31:0]$ and/or the (k−1)'th stream data $A_{k-1}[31:0]$ in response to a check signal CHK. At least the lowest two bytes O_STR[15:0] of the output stream data O_STR[31:0] may be stored in the buffer 230.

When the k'th stream data $A_k[31:0]$ stored in the buffer 220 and the (k−1)'th stream data $A_{k-1}[31:0]$ stored in the buffer 210 are input into the EPB checker 240, the stream data stored in the buffer 230 may be input to the EPB checker 240 as the (k−2)'th stream data $A_{k-2}[15:0]$.

With reference to the k'th stream data $A_k[31:0]$ of the buffer 220, the (k−1)'th stream data $A_{k-1}[31:0]$ of the buffer 210, and the (k−2)'th stream data $A_{k-2}[15:0]$ of the buffer 230, the EPB checker 240 may determine whether one or more EPBs are included in the k'th stream data $A_k[31:0]$, the (k−1)'th stream data $A_{k-1}[31:0]$, or the k'th stream data $A_k[31:0]$ and the (k−1)'th stream data $A_{k-1}[31:0]$. The case that one or more EPBs are included in the k'th stream data $A_k[31:0]$ and the (k−1)'th stream data $A_{k-1}[31:0]$ is one of five cases Case 0~Case 4 shown in FIG. 3.

FIG. 3 is an exemplary diagram of various cases in which one or more emulation prevention bytes are included in stream data.

The EPB checker 240 may refer to the k'th stream data $A_k[31:0]$, the (k−1)'th stream data $A_{k-1}[31:0]$, and/or the (k−2)'th stream data $A_{k-2}[15:0]$ in order to examine whether one or more '0x03's included in the k'th stream data $A_k[31:0]$, the (k−1)'th stream data $A_{k-1}[31:0]$, or the k'th stream data $A_k[31:0]$ and the (k−1)'th stream data $A_{k-1}[31:0]$ is are one or more EPBs and/or one or more normal bytes. For example, in the case that the byte A7 of the (k−1)'th stream data $A_{k-1}[31:0]$ includes '0x03' (as in 'Case 0'), the EPB checker 240 may need to refer to the (k−1)'th stream data $A_{k-1}[31:0]$ and the (k−2)'th stream data $A_{k-2}[15:0]$ in order to determine whether '0x03' of the byte A7 is an EPB.

In another example, as in 'Case 3', if the byte A4 of the (k−1)'th stream data $A_{k-1}[31:0]$ includes '0x03', the EPB checker 240 may need to refer to the k'th stream data $A_k[31:0]$ and the (k−1)'th stream data $A_{k-1}[31:0]$ in order to determine whether '0x03' of the byte A4 is an EPB.

In yet another example, as in 'Case 4', if the byte A3 of the k'th stream data $A_k[31:0]$ includes '0x03' and the byte A7 of the (k−1)'th stream data $A_{k-1}[31:0]$ also includes '0x03', the EPB checker 240 may need to refer to the k'th stream data $A_k[31:0]$, the (k−1)'th stream data $A_{k-1}[31:0]$, and the (k−2)'th stream data $A_{k-2}[15:0]$ in order to determine whether '0x03' of the bytes A7 and/or A4 are one or more EPBs.

When one or more of the bytes A7~A4 of the (k−1)'th stream data $A_{k-1}[31:0]$ includes an EPB '0x03', the EPB checker 240 may provide the byte shifter 250 with byte position information as the check signal CHK. In example embodiments, the check signal CHK may comprise as many as 8 bits (e.g., CHK[7:0]). Each bit may correspond, for example, to one of the bytes A7~A0.

The byte shifter 250 may output the output stream data O_STR[31:0] by shifting the k'th stream data $A_k[31:0]$ and/or the (k−1)'th stream data $A_{k-1}[31:0]$ in response to the check signal CHK.

As an example, in 'Case 0', as the byte A7 of the (k−1)'th stream data $A_{k-1}[31:0]$ includes the EPB '0x03', the bytes A6~A4 of the (k−1)'th stream data $A_{k-1}[31:0]$ and the byte A3 of the k'th stream data $A_k[31:0]$ may be shifted to left by one byte, and then the output stream data O_STR[31:0] may be generated, for example, with 4 bytes. During this process, the newly generated output stream data O_STR[31:0] is '0x01040506'. In the next clock cycle, the k'th stream data $A_k[31:0]$ of the buffer 220 may be transferred to the buffer 210 as the (k−1)'th stream data $A_{k-1}[31:0]$. During this process, as '0x03' of the byte A7 of the (k−1)'th stream data $A_{k-1}[31:0]$ has been removed from the output stream data O_STR[31:0] in the previous clock cycle, the byte shifter 250 may be used for generating the output stream data O_STR[31:0] from the byte A6 of the (k−1)'th stream data $A_{k-1}[31:0]$ in a new clock cycle. As such, the pointer 260 may be used for representing a positional change of generating the output stream data O_STR[31:0] by eliminating the EPB in the previous clock cycle.

The pointer 260 may output a pointer value P that increases by one whenever an EPB is removed by the byte shifter 250. At the initial time, the pointer value P may be '0' and the byte shifter 250 may be used for generating the output stream data O_STR[31:0] from the byte A7 of the (k−1)'th stream data $A_{k-1}[31:0]$. As shown by 'Case 0' through 'Case 3', if the (k−1)'th stream data $A_{k-1}[31:0]$ includes the EPB '0x03', the pointer value P may increase by one and/or may become '1'.

If at the initial time, the pointer value P is '0' and, as shown by 'Case 4', the k'th stream data $A_k[31:0]$ and the (k−1)'th stream data $A_k[31:0]$ both include EPBs of '0x03', the pointer value P may increase by two and/or may become '2'.

FIGS. 4 through 6 are exemplary diagrams showing various patterns of stream data in order to explaining operation of the EPB remover 120 of FIG. 2.

Referring to FIG. 4, if the pointer value P is '0' at the cycle T11 of the clock signal CLK and the byte A7 includes the EPB '0x03', the output stream data O_STR[31:0] may be '0x01040506'. In the cycle T12 of the clock signal CLK, the (k−2)'th stream data $A_{k-2}[15:0]$ input to the EPB checker 240 may be '0x0506', the (k−1)'th stream data $A_{k-1}[31:0]$ may be '0x06070809', and/or the k'th stream data $A_k[31:0]$ may be '0x04050607'. As the pointer value P has been changed from '0' to '1' in the cycle T11 of the clock signal CLK, the output stream data O_STR[31:0] may be '0x07080904'.

Referring to FIG. 5, if the pointer value P is '0' at the cycle T21 of the clock signal CLK and the byte A6 includes the EPB '0x03', the output stream data O_STR[31:0] may be '0x00010405'. In the cycle T22 of the clock signal CLK, the (k−2)'th stream data $A_{k-2}[15:0]$ input to the EPB checker 240 may be '0x0405', the (k−1)'th stream data $A_{k-1}[31:0]$ may be '0x05060708', and/or the k'th stream data $A_k[31:0]$ may be '0x09040506'. As the pointer value P has been changed from '0' to '1' in the cycle T21 of the clock signal CLK, the output stream data O_STR[31:0] may be '0x06070809'.

Referring to FIG. 6, if the pointer value P is '1' at the cycle T31 of the clock signal CLK and the byte A5 includes the EPB '0x03', the output stream data O_STR[31:0] may be '0x00010405'. In the cycle T32 of the clock signal CLK, the (k−2)'th stream data $A_{k-2}[15:0]$ input to the EPB checker 240 may be '0x0405', the (k−1)'th stream data $A_{k-1}[31:0]$ may be '0x04050607', and/or the k'th stream data $A_k[31:0]$ may be '0x08090405'. As the pointer value P has been changed from '1' to '2' in the cycle T31 of the clock signal CLK, the output stream data O_STR[31:0] may be '0x06070809'.

In addition or in the alternative, it is possible to use one or more other values for the one or more EPBs (e.g., '0x02', '0x80', or '0x81').

As discussed above, it may be possible to efficiently remove one or more EPBs from the input stream data. Because the first and second buffers may store the stream data of two words, the output stream data may be generated every clock cycle without delay of the clock cycle even though the input stream data includes one or more EPBs.

While example embodiments have been particularly shown and described, it will be understood by those of ordinary skill in the art that various changes in form and details may be made therein without departing from the spirit and scope of the present invention as defined by the following claims.

What is claimed is:

1. An emulation prevention byte remover, comprising:
 a first buffer;
 a second buffer;
 a third buffer;
 a checker; and
 a shifter;
 wherein the first buffer is configured to store first stream data,
 wherein the second buffer is configured to store second stream data,
 wherein the first buffer is further configured to receive stream data input from an external source or from the second buffer as the first stream data,
 wherein the second buffer is further configured to receive the stream data input from the external source and to store the received stream data as the second stream data,
 wherein the third buffer is configured to store at least part of output stream data from the shifter,
 wherein the checker is configured to determine whether one or more emulation prevention bytes are included in the first stream data and the second stream data based on the first stream data, the second stream data, and the at least part of the output stream data,
 wherein if the checker determines that the one or more emulation prevention bytes are included in the first stream data and the second stream data, the checker is further configured to output a check signal,
 wherein in response to the check signal, the shifter is configured to remove at least one of the one or more emulation prevention bytes from the first stream data, the second stream data, or the first stream data and the second stream data, and
 wherein the shifter is further configured to generate the output stream data based on the first stream data, the second stream data, or the first stream data and the second stream data.

2. The emulation prevention byte remover of claim 1, wherein the first stream data includes a plurality of bytes, and
 wherein the second stream data includes a plurality of bytes.

3. The emulation prevention byte remover of claim 1, wherein the first stream data and the second stream data are continuous with each other.

4. The emulation prevention byte remover of claim 1, wherein in response to the check signal, the shifter is further configured to generate the output stream data by shifting to the left at least one remaining byte of the first stream data, the second stream data, or the first stream data and the second stream data.

5. The emulation prevention byte remover of claim 1, wherein the third buffer is further configured to store at least a lowest two bytes of the output stream data.

6. The emulation prevention byte remover of claim 1, further comprising:
a pointer;
wherein the pointer is configured to output a pointer value that represents a beginning position of the first stream data when the checker determines that the one or more emulation prevention bytes are included in the first stream data and the second stream data.

7. The emulation prevention byte remover of claim 6, wherein the pointer is further configured to increase the pointer value whenever the shifter removes the at least one of the one or more emulation prevention bytes.

8. The emulation prevention byte remover of claim 1, wherein the shifter is further configured to generate the output stream data in a unit word.

9. The emulation prevention byte remover of claim 8, wherein the unit word comprises four bytes.

10. An emulation prevention byte remover, comprising:
a first buffer;
a second buffer;
a third buffer;
a checker;
a shifter; and
a pointer;
wherein the first buffer is configured to store first stream data,
wherein the second buffer is configured to store second stream data,
wherein the third buffer is configured to store third stream data,
wherein the first buffer is further configured to receive stream data input from an external source or from the second buffer as the first stream data,
wherein the second buffer is further configured to receive the stream data input from the external source and to store the received stream data as the second stream data,
wherein the checker is configured to determine whether one or more emulation prevention bytes are included in the first stream data and the second stream data based on the first stream data, the second stream data, and the third stream data,
wherein if the checker determines that the one or more emulation prevention bytes are included in the first stream data and the second stream data, the checker is further configured to output a check signal,
wherein in response to the check signal, the shifter is configured to remove at least one of the one or more emulation prevention bytes from the first stream data, the second stream data, or the first stream data and the second stream data,
wherein the pointer is configured to output a pointer value,
wherein the shifter is further configured to generate output stream data from a position designated by the pointer value, and
wherein at least part of the output stream data is stored in the third buffer as the third stream data.

11. The emulation prevention byte remover of claim 10, wherein the first stream data includes a plurality of bytes, and
wherein the second stream data includes a plurality of bytes.

12. The emulation prevention byte remover of claim 10, wherein the first stream data and the second stream data are continuous with each other.

13. The emulation prevention byte remover of claim 10, wherein in response to the check signal, the shifter is further configured to generate the output stream data by shifting to the left at least one remaining byte of the first stream data, the second stream data, or the first stream data and the second stream data.

14. The emulation prevention byte remover of claim 10, wherein the third buffer is further configured to store at least a lowest two bytes of the output stream data as the third stream data.

15. The emulation prevention byte remover of claim 10, wherein the pointer value represents a beginning position of the first stream data when the checker determines that the one or more emulation prevention bytes are included in the first stream data and the second stream data.

16. The emulation prevention byte remover of claim 10, wherein the pointer is further configured to increase the pointer value whenever the shifter removes the at least one of the one or more emulation prevention bytes.

17. The emulation prevention byte remover of claim 10, wherein the check signal comprises byte position information, and
wherein the byte position information represents a position or positions of the one or more emulation prevention bytes in regards to the first stream data and the second stream data.

18. The emulation prevention byte remover of claim 11, wherein the first stream data includes the plurality of bytes that form a first unit word,
wherein the second stream data includes the plurality of bytes that form a second unit word, and
wherein the shifter is further configured to generate the output stream data in a third unit word.

* * * * *